United States Patent [19]

Buchan et al.

[11] 4,090,215
[45] May 16, 1978

[54] ELECTRONIC TIME BASE ERROR CORRECTION METHODS AND ARRANGEMENTS

[75] Inventors: William A. Buchan, Newport Beach; Rainer E. an der Heiden, Anaheim, both of Calif.

[73] Assignee: BASF Aktiengesellschaft, Ludwigshafen am Rhein, Germany

[21] Appl. No.: 728,550

[22] Filed: Oct. 1, 1976

[51] Int. Cl.² .......................................... H04N 5/795
[52] U.S. Cl. ...................................................... 358/8
[58] Field of Search ........................................... 358/8

[56] References Cited

U.S. PATENT DOCUMENTS

| | | | |
|---|---|---|---|
| 3,637,936 | 1/1972 | Krause | 358/8 |
| 3,890,558 | 6/1975 | Guisinger et al. | 358/8 X |
| 3,921,202 | 11/1975 | Dann et al. | 358/8 |

*Primary Examiner*—Robert L. Richardson

*Attorney, Agent, or Firm*—Keil, Thompson & Shurtleff

[57] ABSTRACT

An electronic time base error correction technique in which the color video signal is recorded so that in playback in at least one channel sync information is provided along with the luminance information and the color burst information along with the chrominance information. Feedback loops are provided to derive from the sync information coarse-correction of the video signal and derive from the burst information fine-correction of the video signal. The color burst extends over the entire blanking interval.

Three different approaches are specifically disclosed: in the first, coarse- and fine-correction are carried out in two tandem connected stages, respectively. In the second, coarse- and fine-correction are accomplished in the same stage by means of a bi-level phase comparator. The third approach is a modification of the second approach, in which the first and second techniques have been combined.

26 Claims, 9 Drawing Figures

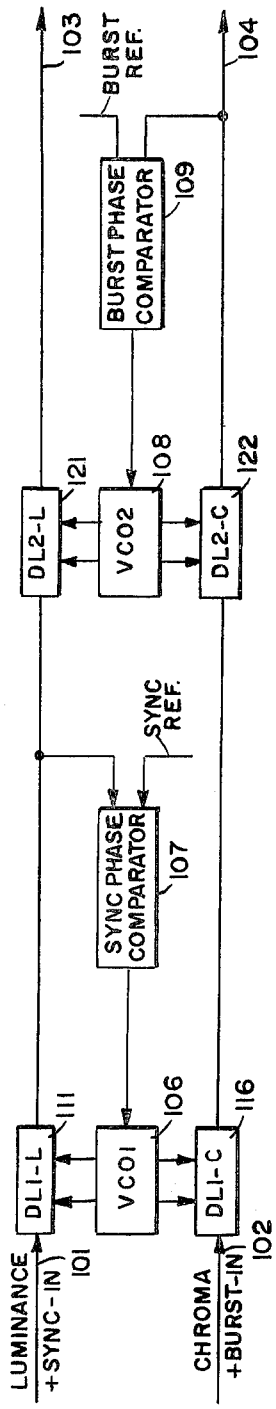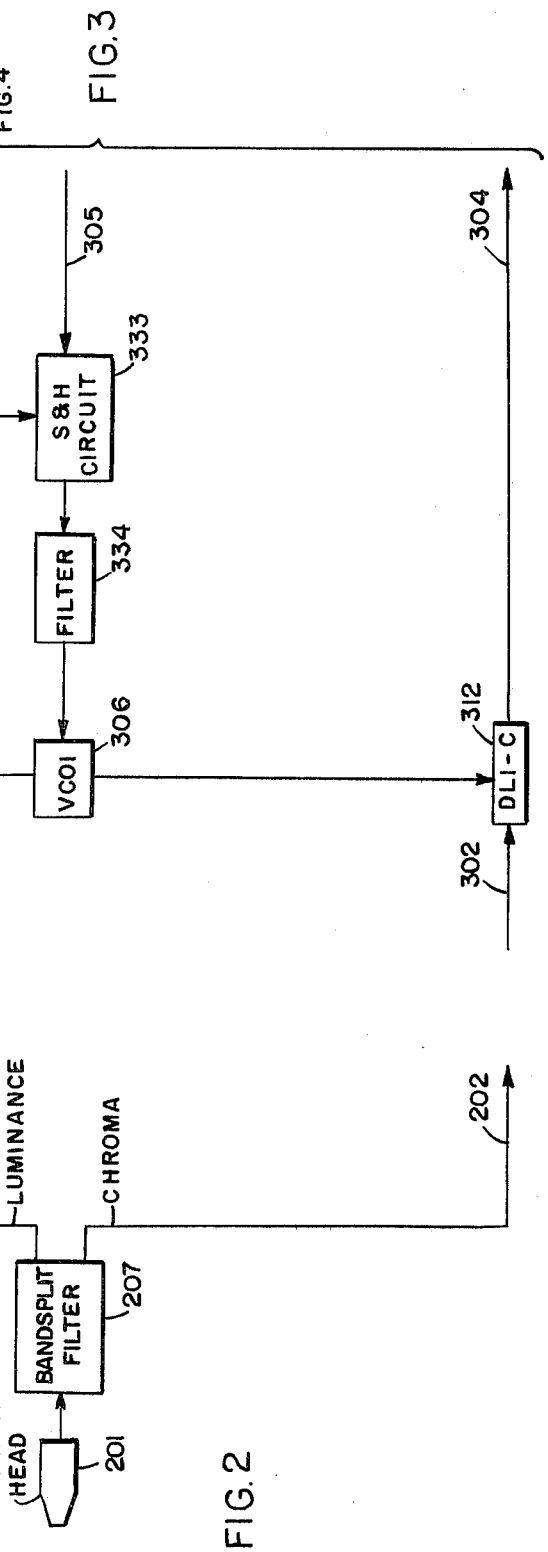

ELECTRONIC TIME BASE ERROR CORRECTION METHODS AND ARRANGEMENTS

BACKGROUND OF THE INVENTION

The invention relates to electronic time base error correction methods and arrangements for color video recording systems, particularly arrangements of this kind which use storage type delay lines as the time base compensating elements in the reproduction of the recorded color video signals.

Substantial elimination of time base error in the playback of recorded color video signals is essential to the production of a picture of commercially acceptable quality. Time base error is due to a number of causes, including speed variations of the recording medium—and, in the case of the use of magnetic tape as the recording medium, also tape-stretching, capstan irregularities, and the like. Time base error is conventionally defined as the time by which the distance between successive horizontal sync pulses departs from its nominal value, approximately 64 microseconds in the NTSC system. If the speed of the recording medium, such as a tape, is too high, the sync pulse will arrive too early and trigger scanning of a new line prematurely. Similarly, if the tape speed is too low, the sync pulse will be late in arriving and scanning of a new line will be triggered too late. Such time base error will not only lead to a distortion of the picture but, in the playback of color video recordings, the resulting phase distortion will give rise to a color imbalance of the displayed picture. While time base error can be reduced to some extent by servo controls acting on the tape drive motor, such mechanical compensation is usually insufficient to hold the time base error within acceptable limits; as a result, electronic time base error correction is needed.

The present invention relates more specifically to electronic time base error correction in color video recording systems in which the luminance component and the chrominance component are recorded on the recording medium in different frequency bands. In a system visualized herein by way of example, the chrominance information of the recorded signal may be accommodated in a frequency range lower than that of the luminance information of that signal; systems of this kind accordingly have become known in the art as "color-under" systems. More particularly, in a specific linear video recording system of this kind to which the invention is applicable, the chroma information may be recorded as amplitude modulated on a carrier of approximately 500 khz and the luminance information recorded as frequency modulated on a carrier of about 4 mhz. In order to reproduce correctly the chroma portion this approximately 500 khz modulated chroma signal must be synchronously demodulated after retrieval from the tape. Loss of synchronization would result in improper color reproduction. In order to insure synchronous demodulation of the chroma signal the residual time base error at the input of the chroma demodulator should preferably be less than 150 nanoseconds. Since the magnitude of time base error off-tape is normally in the order of 4 to 6 microseconds it can be seen that significant time base correction must be effected.

In systems in which the luminance portion and the chrominance portion are recorded on the tape in different frequency bands the off-tape signal, in the playback circuitry, is usually split into two separate parallel channels, a luminance channel and a chrominance channel. In an electronic time base error correction arrangement for a reproduction system of this kind an analogue delay line, for example of the storage type, is interposed in each of the two channels and the charge transfer rate of these two delay lines is controlled, in a compensating sense, with the aid of a voltage controlled oscillator under the control of a comparator in which a synchronizing signal subject to time base error—typically a sync signal separately recorded on a control track of the tape—is compared with a reference signal. This known technique, however, does not meet the exacting correction requirements present in linear video recording systems such as those outlined above.

OBJECTS AND SUMMARY OF THE INVENTION

It is accordingly one object of the invention to provide a playback system with improved electronic time base error correction capabilities.

It is another object of the invention to effect the electronic time base error correction in two-band reproduction systems of this kind in such a way that variations, for example due to manufacturing tolerances, in the parameters of the delay lines themselves are automatically compensated for.

It is yet another object of the invention to provide an electronic coarse-correction as well as an electronic fine-correction arrangement in two-band playback systems.

With the foregoing and other objects in mind, in the electronic time base error correction technique according to the invention the color video signal, broadly speaking, is recorded in such a way that the luminance band—hereinafter also referred to as luminance channel portion contains sync information along with the luminance information and that the chroma band—hereinafter also referred to as chroma channel portion contains color burst information along with the chrominance information; and feedback loops are provided to derive from the sync information in one channel coarse correction of both bands and derive from the burst information in the other band fine correction for both bands. In this fashion optimum time base error correction is obtained in a simple manner and with a minimum amount of equipment.

This is an important consideration, particularly if it is kept in mind that in those systems—of which examples are given hereinbelow—which use two physically separate time base error correction channels, separate delay lines are required for the two parallel channels in question. On the other hand, where, as in the first circuit arrangement described hereafter, only a single time base error correction channel is employed, the delay lines in this one channel, because of the large combined bandwidth of the luminance and chrominance signals as recorded, must be of relatively broad band design in order to be able to handle the entire bandwidth.

Preferably the above-mentioned color burst information, as recorded, extends substantially over the entire blanking interval so that the phase detection of this burst information is facilitated. Such an extension of the time for the burst is possible in this instance since, with the sync information carried by a separate band, the time for the burst is not confined, as it typically is, to the back porch of the sync pulse. By thus making efficient use of the chroma band a burst of several, say five, cycles length is being provided in spite of the relatively low—approximately 500 khz—frequency, and hence relatively long period of the chroma carrier, and this result is brought about without the necessity of setting a separate channel aside for this purpose. A burst of several cycles duration is particularly desirable in the time base correction of linear video recording systems because, although these systems are of incomparably simpler design, they use higher tape speeds and, consequently, their correction loops generally speaking require larger bandwidths.

Three different approaches are being proposed: in the first, coarse- and fine-correction are carried out in two tandem-connected stages respectively. In the second—which involves the use of a "bi-level," that is combination coarse and fine, phase comparator forming an important aspect of the invention—coarse- and fine-correction are accomplished in the same stage. The third approach is a modification of the second approach, in which in effect the first and second techniques have been combined.

It may be added that, for example through U.S. Pat. Nos. 3,580,991 and 3,100,816, electronic time base error correction systems are known per se in which coarse correction is effected under the control of the sync pulse and fine correction under the control of the color burst. However, in these systems which are of the single channel type, at least one of the aforementioned controls is of the feed forward kind.

BRIEF DESCRIPTION OF THE DRAWINGS

Corresponding embodiments of the invention will be described hereinafter with reference to the accompanying drawings in which:

FIGS. 1A and 1B are simplified block diagrams illustrating the first embodiment of the invention in which two tandem electronic correction stages are provided, the first serving for coarse correction and the second for fine correction.

FIGS. 2 to 4, collectively, show a more detailed schematic diagram illustrating the second embodiment of the invention in which coarse- and fine-correction are effected in the same stage by means of a bi-level phase comparator; this stage may be the only electronic time base error correction stage used; in the case of the modification referred to, it may instead be the second stage of a two-stage electronic correction arrangement. More specifically, FIG. 2 shows the magnetic head and the bandpass filter for splitting the recorded signal in reproduction into a luminance component and a chrominance component, and it also shows the frequency demodulator in the luminance channel;

FIG. 3 shows the first stage, used only in the case of the aforementioned modification of this embodiment; and FIG. 4 shows the only stage—or the second stage, as the case may be of the second embodiment, which uses the bi-level phase comparator.

DETAILED DESCRIPTION

Figure 1A:
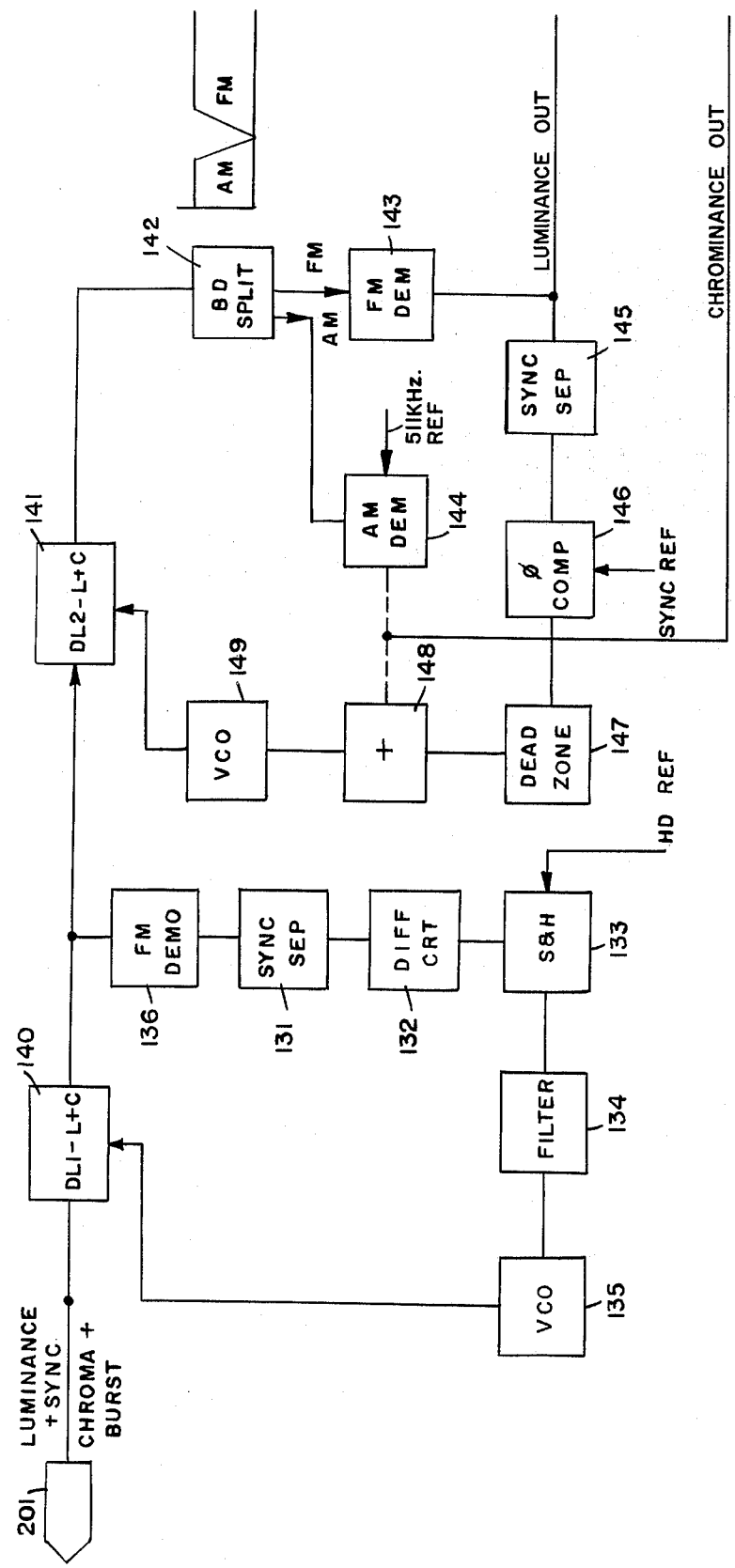

FIGS. 1 A and B illustrate in block diagram form the first embodiment which employs a first stage for coarse-correction only and a second stage for fine-correction only. More specifically, FIG. 1A shows one example of this first embodiment, in which the two frequency bands for luminance and chroma, respectively, are passed in playback over a single physical time-base-error-correction channel, whereas in the modification shown in FIG. 1B two separate physical channels are used for this purpose. It should, however, be noted that some of the details shown with particular reference to the second embodiment in FIGS. 2 to 6 and described with reference thereto hereinbelow, are applicable to the first embodiment as well and to this extent should be understood to be supplemented by this more specific disclosure. In fact, FIG. 3 when taken in conjunction with ramp generator 444 of FIG. 4 may be construed to be a preferred implementation of the first (left) correction stage of FIG. 1B; and FIG. 2 should accordingly be considered as preceding the two-stage correction arrangement of FIG. 1B in the playback circuitry.

Thus referring first to FIGS. 1A and 2, reference 201 denotes the magnetic head of a linear video tape recorder, which scans the magnetic tape (not shown) to reproduce, in playback, the signal recorded thereon. It is assumed herein that in recording the signal on the magnetic tape the luminance information, as well as the sync signal along with it, is frequency modulated on a center frequency of approximately 4 mhz; that the chroma information is amplitude modulated on a carrier frequency of approximately 500 khz—more specifically 511 khz—, this also being the frequency of the color burst appearing in this chroma band throughout the approximately 10 microsecond blanking interval; and that the audio information is similarly modulated on a carrier frequency of about 100 khz.

In FIG. 1A a preferred example of the first embodiment of the inventive circuit is shown. A precondition for that embodiment however is a bandwidth of the delay lines DL 1−L+C(140) and DL2− L+C(141) sufficiently great for both the frequency modulated luminance signal and the AM modulated chroma signal. Stages 131–134 in FIG. 1A are identical with stages 331–334 in FIG. 3. The coarse correction portion further includes a VCO 135 which is connected to the control input of delay line 140 and an FM demodulator 136 which is connected to the output of delay line 140 and input of sync separator 131. In the fine-correction portion of the circuit in FIG. 1A the combined luminance and chrominance signal passes through the DL2−L+C delay line and is split in the bandsplit stage 142 into low and high frequency band signals. The luminance part thereof is then demodulated in the FM demodulator 143 and the chrominance part is demodulated in the AM demodulator 144. The output signal of the FM demodulator passes through a sync separator 145, phase comparator 146, dead zone 147 which can be the same as stage 472 in FIG. 4 and adder 148 to VCO 149 which controls the propagation velocity of delay line 141. Adder 148 is at its second input connected with the output of AM demodulator 144, which can be simply realized as a phase comparator. Further explanation of the function of the single stages and of the combination of all stages in FIG. 1A can be taken from the following description of the other figures. In the herein concerned color recording system it is important that one of the following preconditions will be fulfilled.

a. Luminance and chrominance information are at playback synchronous with reference to tapelock (not described hereunder) or
   b. a reference signal is generated synchronous with the Y signal by means of a phase locked loop having very low bandwidth. In this case also the burst reference frequency is a multiple of the horizontal sync reference frequency.

Figure 5:
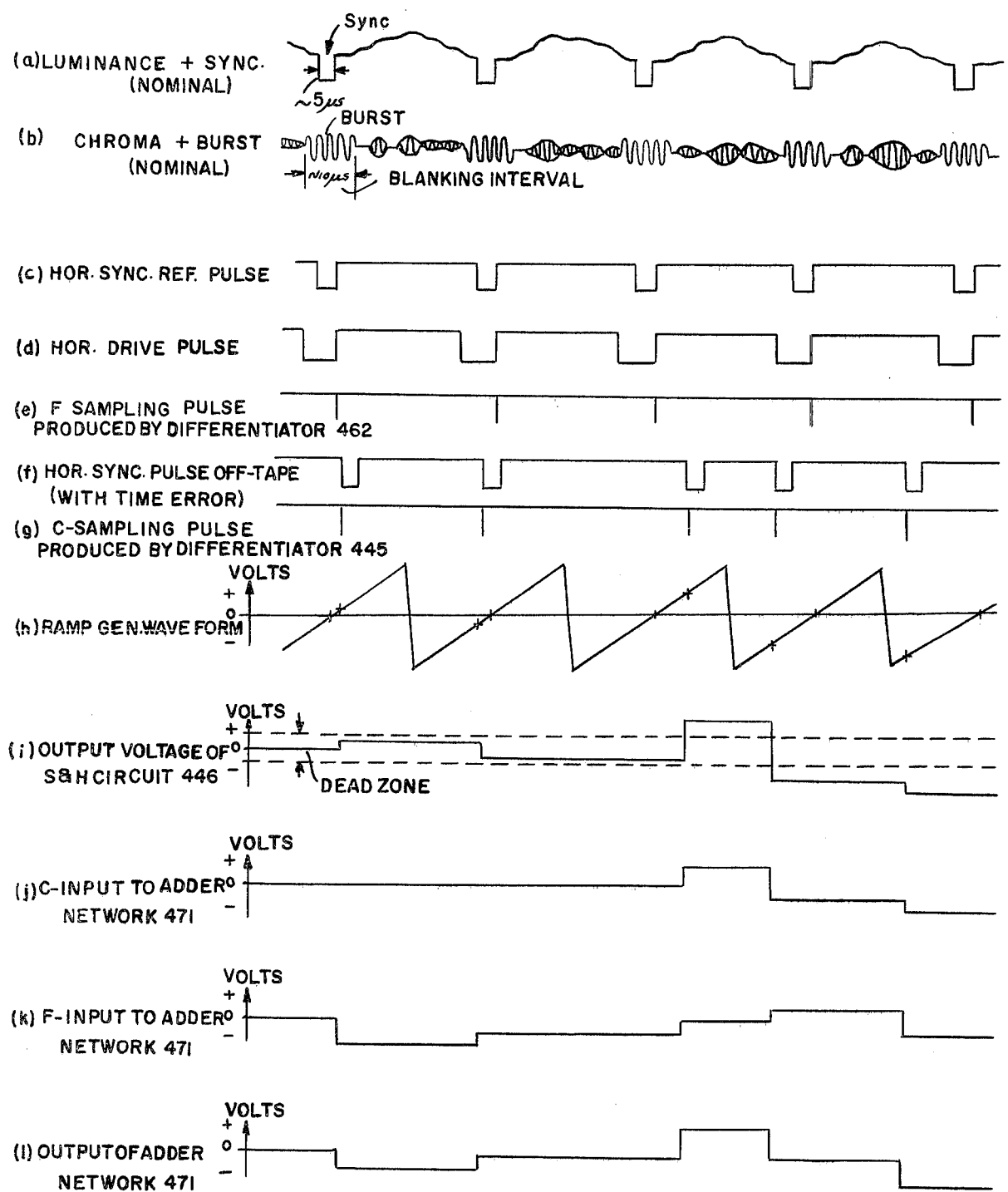
FIG. 5 is a chart illustrating various wave forms occurring in the second embodiment, some of these wave forms being applicable to the first embodiment as well.
Figure 6:
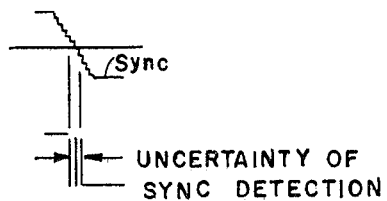
FIG. 6 shows the leading edge of the sync pulse in an enlarged representation to illustrate the uncertainty of sync detection.

Turning now to the two-channel modification, FIG. 1B, of the first embodiment, with conductors 201, 202, FIG. 2, connected to conductors 101, 102, respectively, of FIG. 1B, it will be seen that after demodulation in FM demodulator 208, FIG. 2, back to baseband, the luminance and sync information in the first channel of the electronic time base error correction arrangement (upper line in FIG. 1B) accordingly has the wave form illustrated in line (a) of the chart FIG. 5. Similarly the chrominance and burst information in the second channel of this arrangement (lower line in FIG. 1B) has the form illustrated in line (b) of FIG. 5. As will be seen from FIG. 2, no demodulation of the chroma information is effected at this point.

As shown in the left portion of FIG. 1B, the loop used in the first stage of this two-stage electronic time base error correction arrangement is a sync loop which includes sync phase comparator 107 and voltage controlled oscillator 106, the output of the latter in turn being connected to the control connections not only of the DL1—L delay line 111 in the luminance channel but also of the DL1—C delay line 112 in the chrominance channel. This sync loop being taken off a point of the luminance channel following delay line 111, namely by means of a sync separator not shown in FIG. 1B, is a feedback loop, as also are all the other correction loops disclosed herein. The use of feedback loops rather than feed-forward controls has the distinct advantage that the correction takes variations of the parameters of the delay line itself, such as caused by manufacturing tolerances, automatically into consideration. The delay lines shown herein are assumed to be of the storage type and they are preferably implemented as bucket brigades or charge coupled devices. Delay lines of this kind are well known in the art.

In operation, the luminance signal enters delay line DL1—L and its sync signal which is affected by time base error, see FIG. 5, line (f), is compared by phase comparator 107 with an accurate sync reference frequency, see FIG. 5, line (c). The phase error voltage appearing at the output of phase comparator 107 is used to control the outputs of voltage controlled oscillator VCO 1 which drives both delay lines DL1—L and DL1—C to adjust the charge transfer rate of both these delay lines, and hence the time delay in both channels in a compensating sense. That is, if the comparator determines that the phase difference of the demodulated off-tape sync signal and the—typically crystal controlled—reference signal is not zero the output frequency of voltage controlled oscillator VCO 1 is modified so as to speed up or slow down the passage of video information through the two delay lines as required. Note that, since both delay lines DL1—L and DL1—C are driven by the same voltage controlled oscillator, the delay to which the chrominance is subjected is identical to that to which the luminance is subjected. In this first correction stage of FIGS. 1A and B then, coarse time base error correction is effected by sync edge detection—more particularly with the aid of a sampling pulse derived from the leading edge of the sync pulse, see lines (f) and (g) of FIG. 5—and the correction of the chrominance signal is effected in a "piggyback" fashion as it were.

Starting with 4 to 6 microseconds of time base error, a sync correction stage such as that shown in the left portion of FIG. 1A and B can reduce the time base error to about 300 nanoseconds. This remaining error is due to uncertainty of detecting the sync edge. Although the leading edge of each sync signal is shown in row (a) of FIG. 5 as a vertical line, the enlarged representation of this edge of the sync pulse illustrated in FIG. 6 indicates that the sync leading edge is in reality a sloped line which makes detection somewhat difficult. Thus, if the residual time base error is to be further reduced, for example to less than 150 nanoseconds as required for synchronous demodulation of the chroma signal, additional correction independent of this sync detection uncertainty is needed.

In FIGS. 1A and B this additional correction is provided by connecting, in tandem with the above first stage, a second stage in which a burst loop is used for the time base correction of both channels. To this end a second delay line 121 is interposed in the luminance channel and similarly a second delay line 122 in the chrominance channel and the control inputs of both of these delay lines—two control inputs for each of the four delay lines have been assumed in FIG. 1B by way of example—are connected in parallel to the output of a second voltage controlled oscillator 108 the input of which in turn is connected to the output of a burst phase comparator 109. This comparator has one input connected to a stable source of burst reference frequency such as a crystal oscillator, and another input connected to a point in the chroma channel following the delay line 122.

In operation then, the chrominance burst is compared in comparator 109 with the burst reference frequency from the crystal oscillator and the phase error voltage output of this comparator is used to control voltage controlled oscillator 108 which in turn drives both delay lines DL2—L and DL2—C simultaneously. The second loop of the system shown in FIGS. 1 A and B thus looks to the chrominance burst of the off-tape signal to achieve fine time base error correction and in this instance it is the delay line DL2—L in the luminance channel which is taken along in a "piggy-back" fashion. As indicated above and as shown on line (b) of FIG. 5, the chrominance plus burst signal has a chroma carrier burst lasting above five cycles at 511 khz for a total of about 10 microseconds. This results in approximately 10 zero crossings of the burst which can readily be detected in the second loop; consequently, the accuracy of the system is considerably enhanced.

Assuming again that the incoming off-tape video signal has time base error on the order of 4 microseconds, the first feedback loop of FIGS. 1 A and B corrects this time base error to a residual of about 300 nanoseconds and the second feedback loop corrects to about 50 to 100 nanoseconds. With residual time base error of less than 150 nanoseconds required for synchronous demodulation of the chrominance signal—see the description given herein below of the second embodiment—the system of FIGS. 1 A and B then is quite effective in removing sufficient time base error to achieve an acceptable TV picture.

By way of example the delay lines of the first stage may be about 20 microseconds in length and they are capable of adjustment by about ±5–8 microseconds. Assuming that DL1−L and DL1−C are charge coupled devices they are preferably constituted of about 455 elements. Delay lines DL2−L and DL2−C may be charge coupled devices of approximately 100 elements. All delay lines may be also charge coupled devices of appropriate numbers of elements.

Figure 4:
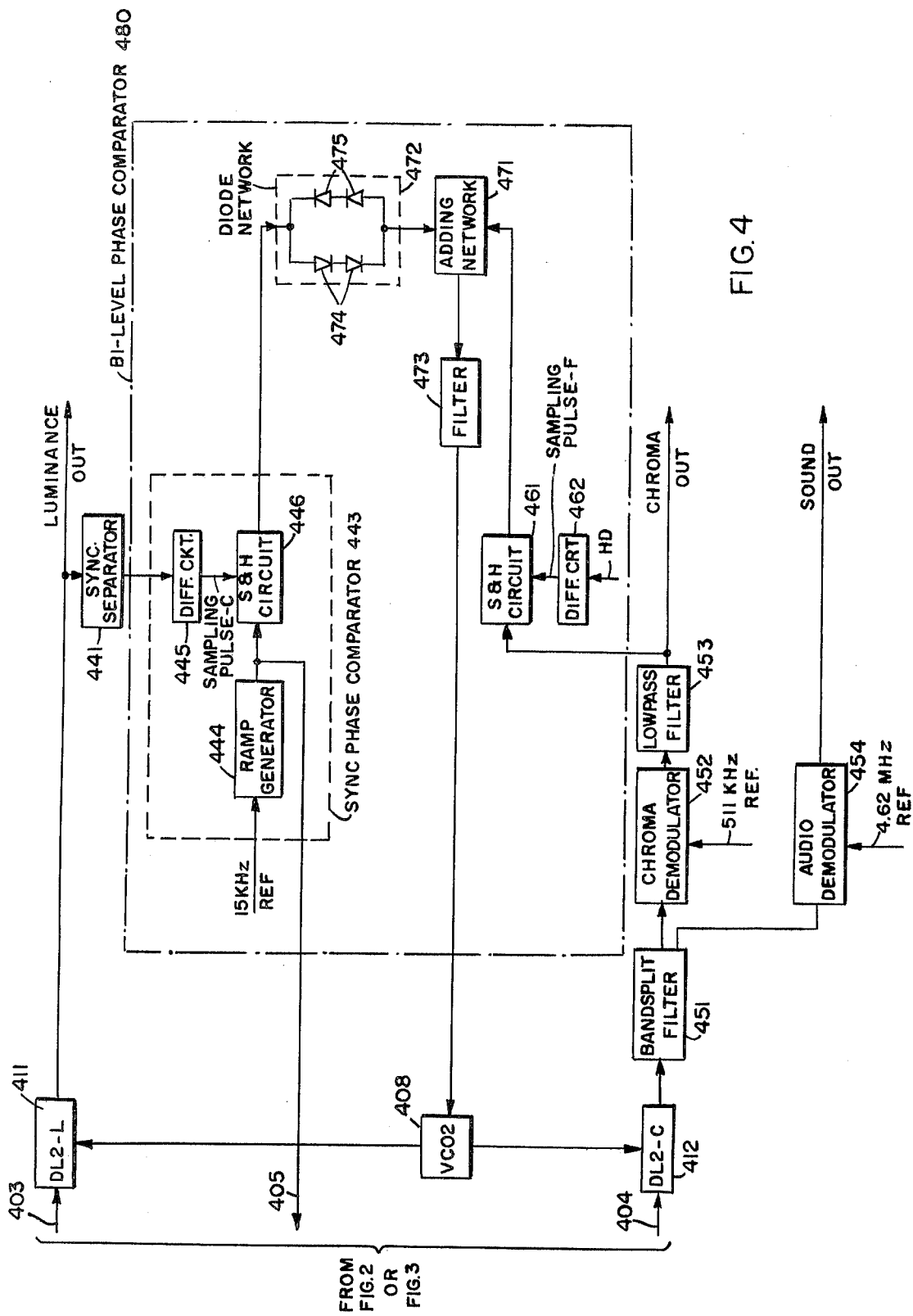

Although the two-stage correction system of FIG. 1B succeeds in providing the necessary degree of time base error correction, it does require 4 variable analogue delay lines. The second embodiment has the advantage over the first that it is able to afford both coarse- and fine-correction by less expensive means. The key to this improvement is the use of a bi-level phase comparator, FIG. 4, which is capable of driving a single corresponding pair of parallel delay lines in a single stage. As an alternative, however, this bi-level comparator stage could also be used in the second stage of a two-stage time base error correction system if desired. More particularly, if the bi-level phase comparator stage, FIG. 4, is used as a single stage, the channel conductors 201,202 of FIG. 2 should be considered to be directly connected to conductors 403 and 404, respectively, of FIG. 4. On the other hand in the case of the aforementioned alternative, FIG. 3 is additionally used as an initial coarse-correction stage and in this instance conductors 201,202, FIG. 2, are connected instead to conductors 301 and 302, respectively, of FIG. 2, and conductors 303, 304, 305, FIG. 3, are respectively connected to conductors 403, 404 and 405, FIG. 4.

It should be noted in passing that the bi-level phase comparator according to the invention is useful also in other than two-channel playback systems—just as long as the video signal reproduction circuit, in addition to the video information, also carries sync and color burst information to which the sync feedback loop and the burst feedback loop for the delay line means can respectively be locked.

In FIG. 4 the delay line in the luminance plus sync channel is designated as 411 and that in the chrominance plus burst channel as 412. Actually, the lower channel of FIG. 4, and likewise in FIGS. 2 and 3, is made up of a chroma band portion which, as indicated above, is modulated on a chroma carrier of 511 khz and an audio band portion which is modulated on an audio carrier of approximately 100 khz. Band split filter 451 serves to separate these two portions. The audio portion, as shown, is demodulated by an audio modulator 454 using a 4.62 mhz reference to provide an audio output on the Sound Out lead; the details of this audio demodulation are of no interest in the context of the present invention. The chroma portion on the other hand is impressed on one input of synchronous double-balanced demodulator 452 the other input of which is connected to a stable 511 khz reference frequency source. The output of this chroma demodulator 452 furnishes, by way of low pass filter 453, a chroma output at baseband on conductor Chroma Out. Typically the other end of this conductor is connected to the input of encoding circuitry in which the chroma signal may be re-encoded, for example in accordance with NTSC standards. The output of the other delay line, 411, in the luminance plus sync channel passes the luminance output at baseband to the Luminance Out conductor. In this connection it will be recalled that the luminance signal had been earlier demodulated in FM demodulator 208, FIG. 2.

The bi-level phase comparator collectively designated 480 in FIG. 4 primarily comprises a sync phase or coarse comparator portion 443; a burst phase or fine comparator portion which latter principally includes sample-and-hold circuit 461; a diode network 472 in the output of sync phase comparator 443; an adding network 471 in which the coarse-correction error voltage coming from sync phase comparator 443 through diode network 472 is combined with the fine-correction error voltage received from the output of sample-and-hold circuit 461; a filter 473; and a voltage controlled oscillator 408 the input of which is connected to the output of adding network 471 through the just-mentioned filter 473. The outputs of oscillator 408 are connected to the control inputs of the two delay lines DL2−L, DL2−C in parallel.

As will be seen from FIG. 4 sync phase comparator 443 contains, in addition to sample-and-hold circuit 446, a differentiating circuit 445 and a ramp generator 444. Ramp generator 444 is connected to a sync reference source of horizontal line frequency (approximately 15 khz), thus producing a linear sawtooth wave once for each horizontal line, compare rows (c) and (b) of the chart FIG. 5; and differentiating circuit 445 which at its input is connected via sync separator 411 to the output of DL2−L delay line 411, generates a sampling spike C at the leading edge of each sync pulse, see lines (f) and (g) of FIG. 5; C is used herein to indicate coarse-correction and F stands for fine-correction. Sample-and-hold circuit 446 has one of its inputs connected to the output of the ramp generator and the other input connected to the output of the differentiating circuit.

As will be noted from FIG. 5, line (h), the ramp generator provides a sawtooth wave with a linear ramp having a duration of 5–64 microseconds preferably of 5 microseconds — corresponding to the maximum length of the time base error which can occur in the system which is tape locked so that the sync pulse may be picked up anywhere it appears during this time period. A longer time period would increase the uncertainty in the slope of the ramp and therefore would increase a long term time shift which is not desired here. More specifically, the sample-and-hold circuit 446, in a manner known in the art produces an output voltage the magnitude of which, as indicated in line (i) of FIG. 5 depends on the point in time at which the narrow sampling pulse C occurs with respect to the sawtooth wave and this point in time in turn is governed, generally speaking by the phase relation that each sync pulse off-tape (line f), because of time base error, happens to have with respect to its nominal time of occurrence (line a). As indicated in line (i) of FIG. 5, the controlled voltage output of sample-and-hold circuit 446 is maintained for one line, namely with the aid of an integrating circuit, typically consisting of a shunt capacitor followed by a series resistor, which holds the voltage resulting from a given sampling operation at a substantially constant level until a new voltage level is established by the next following sampling action.

Due to the uncertainty of sync detection (see FIG. 6) the exact time of occurrence of sampling pulse C relatively to the phase of the off-tape sync pulse is subject to considerable tolerances and it is because of these tolerances that fine-correction is additionally required. As described in more detail hereinafter, the control voltage developed by the fine-correction circuitry of bi-level phase comparator 480 is combined with its coarse-correction output in adding network 471. In order to facilitate this super-position, diode network 472, consisting of the parallel combination of one or more oppositely poled semi-conductor diodes 474,475, is interposed in the output circuit of sample-and-hold circuit 446. Since because of the current-voltage characteristics of these diodes substantially no current is passed thereby until the voltage has reached approximately ½ volt per diode in the forward direction, a "dead zone" is created in the control voltage output of sample-and-hold circuit 446 as shown in line (i) of FIG. 5. In the assumed case that two diodes 474, and similarly two diodes 475, are connected in series with each other, this "dead zone" is about ± one volt. Consequently, output voltages of sample-and-hold circuit 446 which are less than about ± one volt are suppressed, that is only output voltages larger than this amount are made effective. In this manner the minor error voltage excursions which are caused by uncertainty of sync detection are prevented from appearing at the C-input of adder network 471, as shown in line (j) of FIG. 5.

The fine-correction portion of bi-level phase comparator 480 primarily includes sample-and-hold circuit 461 but, in effect, it also includes demodulator 452, this demodulator, together with the associated low-pass filter 453, thus being double used for synchronous chroma demodulation proper and for burst phase comparison in the time base correction circuitry. To this end the output of low-pass filter 453, in addition to being connected to the Chroma Out lead, is also connected to one input of the last-mentioned sample-and-hold circuit 461; the other input of this circuit is connected to the output of differentiating circuit 462 which, in turn, is driven by the horizontal drive pulse HD. As will be seen from lines (d) and (e) of FIG. 5, an F-sampling pulse is produced by differentiator 462 at the trailing edge of each HD pulse. The horizontal drive pulse HD, in the system contemplated herein, is a convenient pulse for driving the differentiating circuit as the trailing edge of this HD pulse appears roughly at the center of the approximately 10 microsecond blanking interval.

Figure 7:
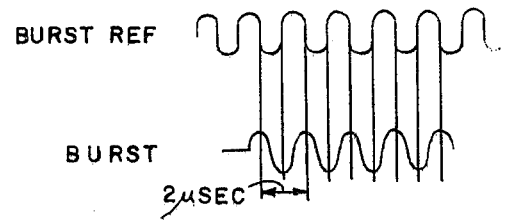
FIG. 7 is a chart showing the wave form of the color burst and that of the burst reference, with the former being 90° out of phase with respect to the latter.
Figure 8:
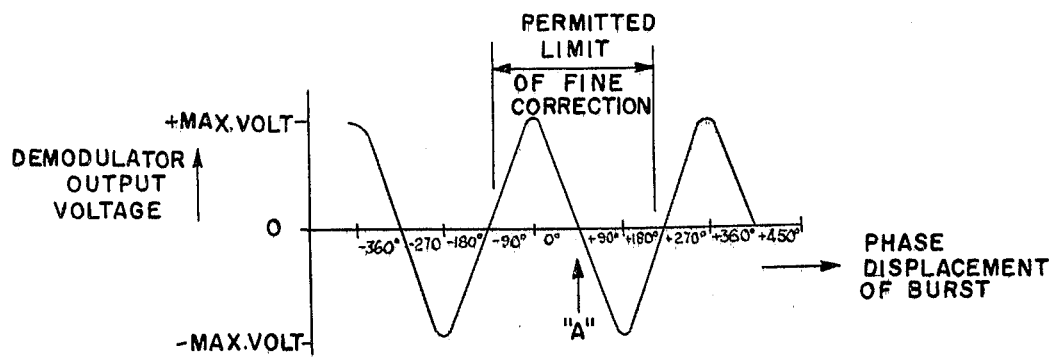
FIG. 8 is a chart showing the demodulator output voltage plotted as a function of the phase displacement of the burst.

The chrominance from tape, modulated at 511 khz, is mixed in double-balanced modulator 452 with the crystal controlled 511 khz reference frequency. This also means that throughout the blanking interval—when no chroma signal is present but the extended chroma signal is present—the phase of the color burst is compared with that of the 511 khz reference frequency. In FIG. 7 the wave form of the burst has been shown underneath that of the burst reference, for the case that the burst is 90° out-of-phase from the reference; under this condition the demodulator will furnish zero output. In FIG. 8 the demodulator output voltage has been shown as a function of the phase displacement of the burst, and this output voltage represents the phase error between the chroma burst and the reference frequency. This phase error voltage is supplied to sample-and-hold circuit 461 which, with the aid of the F-sampling pulse provided by differentiator 462, samples the demodulator output as the horizontal drive rate and at the center of the blanking interval as indicated above. Again an integrator, not shown, is contained in circuit 461, which maintains the output voltage at an approximately constant level until it is reset by the next following sampling operation.

From the foregoing it will be seen that for each received horizontal drive pulse HD a specific output voltage within the fine comparison range will result, this voltage being impressed on the fine-correction input of adder network 471, see line (k) of FIG. 5. In this network the coarse-error and the fine-error are added together as shown in FIG. 5, line (l), and this combined control voltage output of bi-level phase comparator 480 is passed, through filter 473 to the input of common voltage controlled oscillator 408. This oscillator drives both delay lines 411 and 412 simultaneously by an amount, and in a sense tending to compensate for the combined phase error.

Because the coarse-error detector 443, locked as it is to the off-tape horizontal sync pulses, is operating in the linear region of ramp generator 444, it will tend to remove the gross time base error from the signal to reposition the sync pulses within some value less than ±500 nanoseconds. The residual time base error is then less than 1 microsecond. The fine-comparison portion of the bi-level phase comparator locks to the chroma burst —which as indicated in FIG. 7, has a full cycle length of (1/511) ≈ 2 microseconds—and provides fine adjustment. By way of summary, then, the sync correction pushes time base error to the center portion of the bi-level phase comparator characteristic and the burst comparison then corrects for uncertainty of sync edge detection. The bi-level phase comparator brings this result about with a minimum of equipment and, particularly, with the use of only two delay lines.

The following additional explanation of the significance of the two feedback loops is offered:

The sync loop operates in linear fashion since the phase comparator comprises a 64 microsecond ramp generator and operates in the linear range. The sync loop will eventually rezero itself because it operates in the linear mode. Therefore, if, for example, a noise pulse is received which causes the sync loop to go to one end of its range, skipping of a sync pulse and jumping to an adjacent pulse, and consequently dropping of a line, is not possible. However, the chroma phase detector operates in the 90° offset mode, as shown in FIGS. 7 and 8, and does not operate in the linear range. As a result, the burst loop will not go back to its correct zero position. As will be seen from FIG. 8, the phase detector gives zero output when the burst is 90° out-of-phase from the reference. If detection moves to where the burst and reference are in phase, the detector gives maximum positive output. If they are 180° out-of-phase, it gives maximum negative output. But if the system moves to a 270° out-of-phase condition, a zero crossing is again reached. If the detector moves over a whole cycle to 450°, it is again back to zero output. The chroma burst servo loop attempts to track the error by adjusting the voltage controlled oscillator output to stay 90° out-of-phase as indicated by the arrow A in FIG. 8. But if the loop detects a noise signal and shifts over a full cycle, a permanent 2 microsecond jump in the output signal occurs. For this reason the voltage controlled oscillator must have a limit of less than ±180°, for example, ±150°, from normal zero position. This has been indicated in FIG. 8. The sync edge dead zone is designed such that there is no output within the about ±150° preferred operating of the burst detector.

From the foregoing it will also be clear that the burst loop could not be used alone for correction of time base error since the error is so large off-tape that it would cause the burst loop to jump from one cycle to the next (time base error off-tape is 4 microseconds while the length of each cycle of the burst frequency is about 2 microseconds) and the chroma burst will not distinguish between adjacent cycles. Therefore, the sync loop is necessary to bring time base error down to a level which can be reliably handled by the chrominance loop.

As mentioned above, it is also possible to use the correction arrangement of FIG. 4 which employs the bi-level phase comparator, as the second stage of a two-stage time base error correction arrangement. In this modification FIG. 3 is interposed between FIG. 2 and FIG. 4 as above explained.

FIG. 3 provides an initial coarse-correction feedback loop which is very similar to the sync feedback loop of FIG. 4 and therefore requires only a brief description. More specifically, sample-and-hold circuit 333 of FIG. 3 corresponds to sample-and-hold circuit 446 of FIG. 4 except that in this case no separate ramp generator needs to be provided. Instead, ramp generator 444 of FIG. 4 is connected via leads 405 and 305 to the input in question of circuit 333, this ramp generator 444 thus being double-used for both stages. Sync separator 331 and differentiator 332 of FIG. 3 corresponds to sync separator 441 and differentiator 445 of FIG. 4, respectively. The output of sample-and-hold circuit 333 is connected via filter 334 to the input of voltage controlled oscillator 306 and the output of the latter is connected to the control inputs of first-stage delay lines 311 and 312 in parallel to control these two delay lines in a compensating sense. It will be noted then that, with both FIGS. 3 and 4 provided, the coarse adjustment is made twice, once in each of the two stages, and in the second stage a fine adjustment is made simultaneously with the coarse adjustment in that stage.

A two-stage correction system such as that afforded by FIGS. 3 and 4 has the advantage over a single stage system (FIG. 4 alone) that it provides more leeway in the design of the loops involved. Since the precision requirements for the equipment used are less stringent, off-the-shelf type components can more readily be used; also less bandwidth is needed for the second-stage loop system.

We claim:

1. An electronic time base error correction method for color video recording systems, comprising:
   a. providing a recorded color video signal in which luminance information and sync information are carried in one frequency band and chrominance information and color burst information are carried in a different frequency band;
   b. providing, in playback, at least one channel having first and second channel portions, for the luminance and sync information and for the chrominance and burst information, respectively; and
   c. providing feedback loops for the control of the signal delay in said at least one channel, at least one of said feedback loops deriving from the sync information in said first channel portion a coarse-correction for the color video signal and another of said feedback loops deriving from the burst information in said second channel portion a fine-correction for the color video signal 2. An electronic time base error correction method as claimed in claim 1 in which step a) comprises providing color burst information extending, as recorded, over substantially the entire blanking interval.

3. An electronic time base error correction arrangement for a color video recording system, comprising at least one signal channel having first and second channel portions for the luminance and sync information and the chrominance and color burst information of the recorded video signal, respectively, said arrangement comprising two tandem correction stages, the first of said stages including first variable storage-type delay line means interposed in said two channel portions and a sync feedback loop connected to control the propagation velocity of said said first delay line means, and the second of said stages including, in series relationship with said first delay line means, second variable storage-type delay line means interposed in said two channel portions and at least a burst feedback loop connected to control the propagation velocity of said second delay line means.

4. An electronic time base error correction arrangement for a color video recording system, comprising two parallel signal channels, the first channel being representative of at least the luminance and sync information, and the second channel being representative of at least the chrominance and color burst information of the recorded video signal, said arrangement comprising two tandem correction stages, the first of said stages including a first pair of variable storage-type delay lines respectively interposed in said two channels and a sync feedback loop connected to simultaneously control the propagation velocity of both delay lines of said first pair; and the second of said stages including, in series relationship with said first pair, a second pair of variable storage-type delay lines respectively interposed in said two channels and at least a burst feedback loop connected to control the propagation velocity of both delay lines of said second pair simultaneously.

5. An electronic time base error correction arrangement as claimed in claim 4 wherein said sync feedback loop includes, in series relationship, a first-stage phase comparator and a first-stage voltage controlled oscillator, the two inputs of said phase comparator being respectively connected to a reference sync signal source and to a point in said first channel intermediate its two delay lines, and the output of said voltage controlled oscillator being connected in controlling relationship to both said delay lines of said first pair.

6. An electronic time base error correction arrangement as claimed in claim 4 wherein said burst feedback loop includes, in series relationship, a second-stage phase comparator and a second-stage voltage controlled oscillator, the two inputs of said second-stage phase comparator being respectively connected to a reference burst signal source and to a point in said second channel following its second delay line, and the output of said second stage voltage controlled oscillator being connected in controlling relationship to both said delay lines of said second pair.

7. An electronic time base error correction arrangement as claimed in claim 5 wherein said second stage includes another sync feedback loop as well as a burst feedback loop, said last-mentioned two loops being connected to jointly control the propagation velocity of both delay lines of said second pair simultaneously.

8. An electronic time base error correction arrangement as claimed in claim 7 wherein said second stage includes:
   a combination sync and burst phase comparator having
      two sync comparison inputs which are respectively connected to a reference sync signal source and to a point in said first channel following its second delay line,
      two burst comparison inputs which are respectively connected to a reference burst signal source and to a point in said second channel following its second delay line, and an adder means combining the sync comparison output and the burst comparison output of said phase comparator; and a voltage controlled oscillator the input of which is connected to the output of said adder means and the output of which is connected in controlling relationship to both said delay lines of said second pair.

9. An electronic time base error correction arrangement as claimed in claim 8 wherein the sync phase comparator of said first stage and the sync phase comparator of said second stage each includes a separate sample-and-hold means for generating at the beginning of each scan line a coarse-correction error voltage representative of the phase displacement of the corresponding sync pulse and for substantially maintaining said error voltage until the beginning of the next following line;

wherein there is connected to said point in said first channel intermediate its two delay lines a first sync separator means, and to said point in said first channel following its second delay line a second sync separator means;

wherein the sync pulse comparator of said second stage also includes a ramp generator so as to produce a reference sawtooth wave for each scanning line;

wherein the output of said ramp generator is connected to the reference input of the sample-and-hold means of both said stages, said ramp generator thus serving both of said stages in common; and wherein there are provided means in each set stage for producing a sampling spike at the leading edge of each respective separated sync pulse so as to cause said reference sawtooth wave to be momentarily sampled at the beginning of each scanning line, whereby in each said stage the level of said error voltage is a substantially linear function of the phase of the leading edge of the respective separated sync pulse.

10. An electronic time base error correction arrangement as claimed in claim 4 wherein the color burst information, as recorded, extends over substantially the entire blanking interval.

11. An electronic time base error correction arrangement for a color video recording system, comprising two parallel signal channels, the first being representative of at least the luminance and sync information, and the second being representative of at least the chrominance and color burst information, of the recorded color video signal, said two channels having, respectively, interposed therein a first and a second variable storage-type delay line, a sync feedback loop controlling the first of said delay lines and a burst feedback loop controlling the second of said delay lines, bth said feedback loops including a common voltage controlled oscillator connected to control the propagation velocity of both said delay lines simultaneously.

12. An electronic time base error correction arrangement for a color video recording system as claimed in claim 11, wherein the color burst information, as recorded, extends over substantially the entire blanking interval.

13. An electronic time base error correction arrangement for a color video recording system, comprising one playback signal channel for both the luminance and sync information, and the chrominance and color burst information of the recorded color video signal, said luminance and sync information being carried in one frequency band and said chrominance and burst information being carried in a different frequency band of the recorded color video signal, and said channel having therein a first and a second variable storage-type delay line, a sync feedback loop controlling the first of said delay lines and a burst feedback loop controlling the second of said delay lines, each of said feedback loops including a voltage controlled oscillator connected to control the propagation velocity of the corresponding delay line.

14. An electronic time base error correction arrangement as claimed in claim 11, wherein said sync feedback loop includes sync comparator means having a first input which is in circuit connection with a sync reference signal source and a second input, which is in circuit connection with a point in said first channel following said first delay line;

wherein said burst feedback loop includes burst comparator means having a first input which is in circuit connection with a burst reference signal source and a second input which is in circuit connection with a point in said second channel following said second delay line;

wherein both the said feedback loops include adder means having two inputs connected to the output of said sync comparator means and to the output of said burst comparator means respectively; and wherein said common voltage controlled oscillator is in circuit connection with and controlled by the output of said adder means.

15. An electronic time base error correction arrangement as claimed in claim 14, wherein said sync comparator means comprises a sample-and-hold means for generating at the beginning of each scanning line a coarse-correction error voltage representative of the phase displacement of the corresponding sync pulse, and for substantially maintaining said error voltage until the beginning of the next following line.

16. An electronic time base error correction arrangement as claimed in claim 15, wherein there is connected to said point in said first channel a sync separator means;

wherein there is provided a ramp generator, the input of which is connected to said sync reference signal source so as to produce a reference sawtooth wave for each scanning line and the output of which is connected to the reference input of said sample-and-hold means; and wherein there is interposed between said point in said first channel and the other input of said sample-and-hold means a differentiating circuit which produces a sampling spike at the leading edge of each separated sync pulse so as to cause said reference sawtooth wave to be momentarily sampled at the beginning of each scanning line, whereby the level of said error voltage is a substantially linear function of the phase of the leading edge of said separated sync pulse.

17. An electronic time base error correction arrangement as claimed in claim 14, wherein there are provided means for preventing coarse-correction error voltages of less than a predetermined minimum level from being passed from said sample-and-hold means to said adder means.

18. An electronic time base error correction arrangement as claimed in claim 14, wherein there are provided means for limiting the effective range of said burst feedback loop to less than ±180° of phase displacement of said burst.

19. An electronic time base error correction arrangement as claimed in claim 17, wherein said suppressing means includes a parallel combination of oppositely poled semiconductor diodes interposed between the output of said sample-and-hold means and the coarse-correction input of said adder means.

20. An electronic time base error correction arrangement as claimed in claim 14, wherein the chrominance information of said color video signal, as recorded, is amplitude modulated on a chroma carrier of a predetermined frequency, this also being the frequency of the recorded color burst information; and wherein said second channel includes a synchronous amplitude demodulating circuit having one of its inputs connected to a source of said chroma carrier frequency and having its output connected to pass the amplitude demodulated chrominance information to succeeding video circuits, said amplitude demodulating circuit forming part of said burst comparator means.

21. An electronic time base error correction arrangement as claimed in claim 20, wherein said burst comparator means also comprises a sample-and-hold means connected at one of its inputs to the output of said amplitude demodulating circuit, for generating at the beginning of each scan line a fine-correction error voltage representative of the phase displacement of the corresponding color burst, and for substantially maintaining the last-mentioned error voltage until the beginning of the next following line.

22. An electronic time base error correction arrangement as claimed in claim 21, wherein there is provided another differentiating circuit having its input connected to a source of pulses of line repetition frequency appearing within the range of said color burst, and having its output connected to the other input of said sample-and-hold means, said differentiating circuit producing a sampling spike at one edge of each of the last-mentioned pulses.

23. An electronic time base error correction arrangement for a color video recording system, comprising variable storage-type delay line means interposed in a video signal reproduction circuit carrying sync and color burst information in addition to video information;

a sync feedback loop and a burst feedback loop, both controlling said delay line means and both including a common voltage controlled oscillator connected to control the propagation velocity of said delay line means;

said sync feedback loop including sync comparator means having a first input connected to a sync reference signal source and a second input connected to a point in said video signal reproduction circuit which follows said delay line means;

said burst feedback loop including burst comparator means having a first input connected to a burst reference signal source and a second input connected to a point in said video signal reproduction circuit which follows said delay line means;

both said feedback loops further including adder means having two inputs connected to the output of said sync comparator means and to the output of said burst comparator means, respectively; and said common voltage controlled oscillator being connected to and controlled by the output of said adder means.

24. An electronic time base error correction arrangement for a color video recording system, comprising variable storage-type delay line means interposed in a video signal reproduction circuit carrying sync and color burst information in addition to video information;

a sync feedback loop and a burst feedback loop, both said loops including a voltage controlled oscillator connected to control the propagation velocity of said delay line means;

said sync feedback loop including sync comparator means having a first input connected to a sync reference signal source and a second input connected to a point in said video signal reproduction circuit which follows said delay line means;

said burst feedback loop including burst comparator means having a first input connected to a burst reference signal source and a second input connected to a point in said video signal reproduction circuit which follows said delay line means; and both the output of said sync comparator means and the output of said burst comparator means being connected to said voltage controlled oscillator.

25. An electronic time base error correction arrangement as claimed in claim 24, wherein said sync feedback loop and said burst feedback loop each includes a demodulator, at least one of said demodulators serving as the comparator means for the corresponding feedback loop.

26. An electronic time base error correction method for color video recording systems, comprising:

a. providing a recorded color video signal in which luminance information and sync information are carried in one frequency band and chrominance information and color burst information are carried in a different frequency band;

b. providing, in playback, two parallel channels the first representative of said luminance and sync information and the second representative of said chrominance and burst information; and c. providing feedback loops for the control of the signal delay in said two channels, at least one of said feedback loops deriving from the sync information in said first channel a coarse-correction for the color video signal and another of said feedback loops deriving from the burst information in said second channel a fine-correction for the color video signal.

* * * * *